Feb. 7, 1956
H. PIKAL
2,733,439
MACHINE FOR EMBEDDING STICKS IN APPLES
Filed Dec. 6, 1954
4 Sheets-Sheet 2
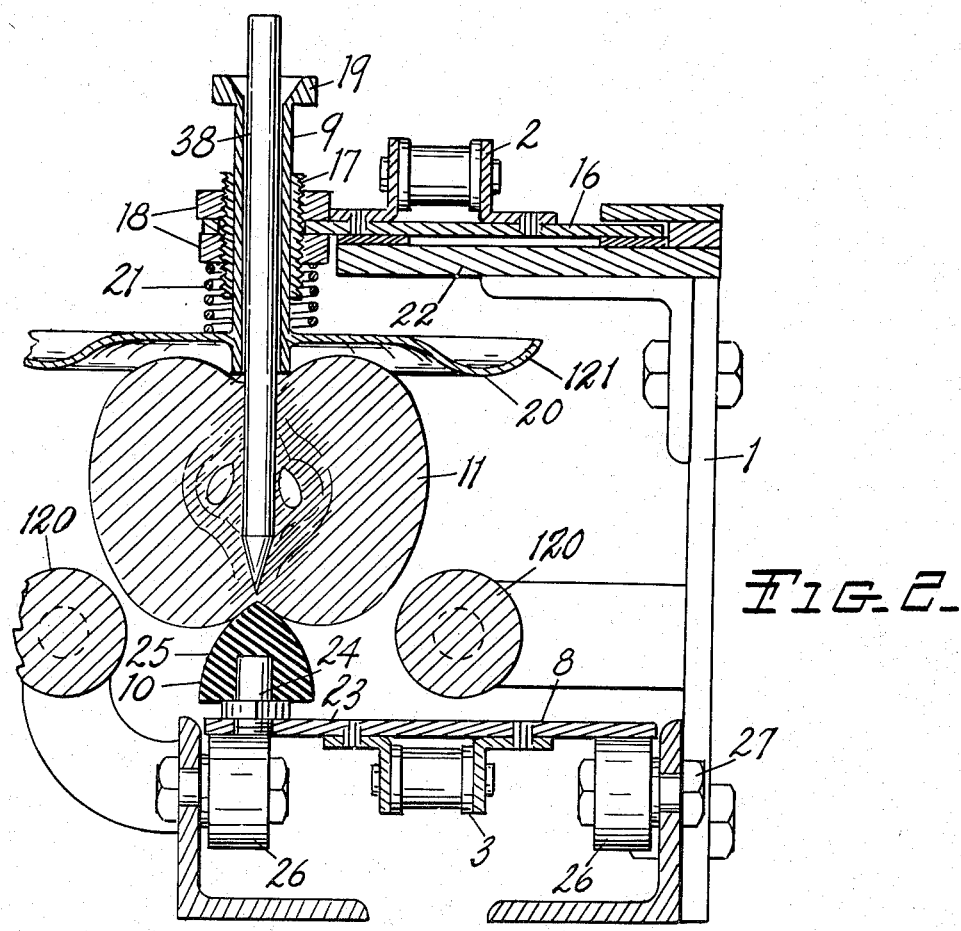
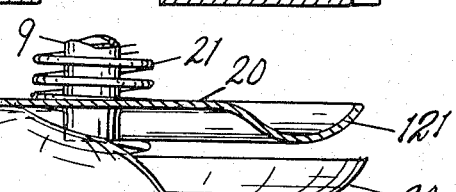
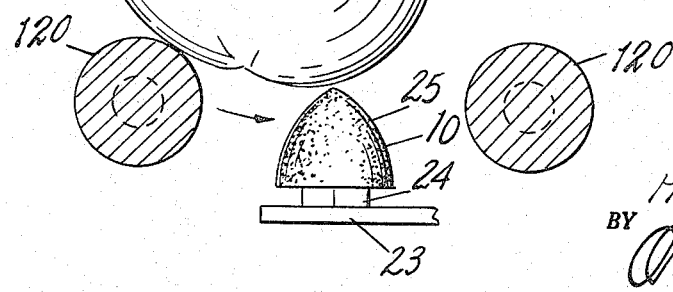
INVENTOR.
Harry Pikal
BY
Otto A. Earl
Attorney.

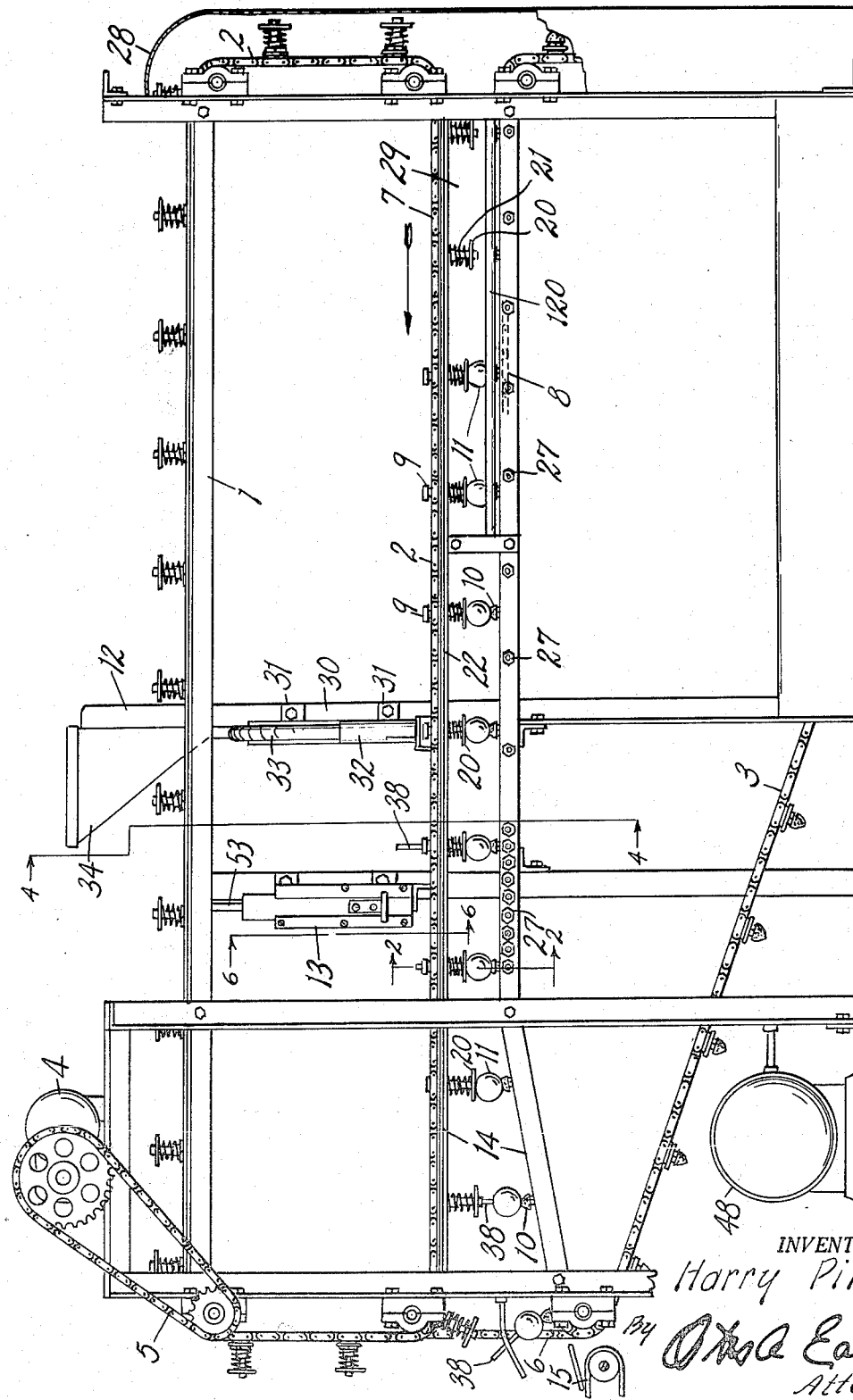

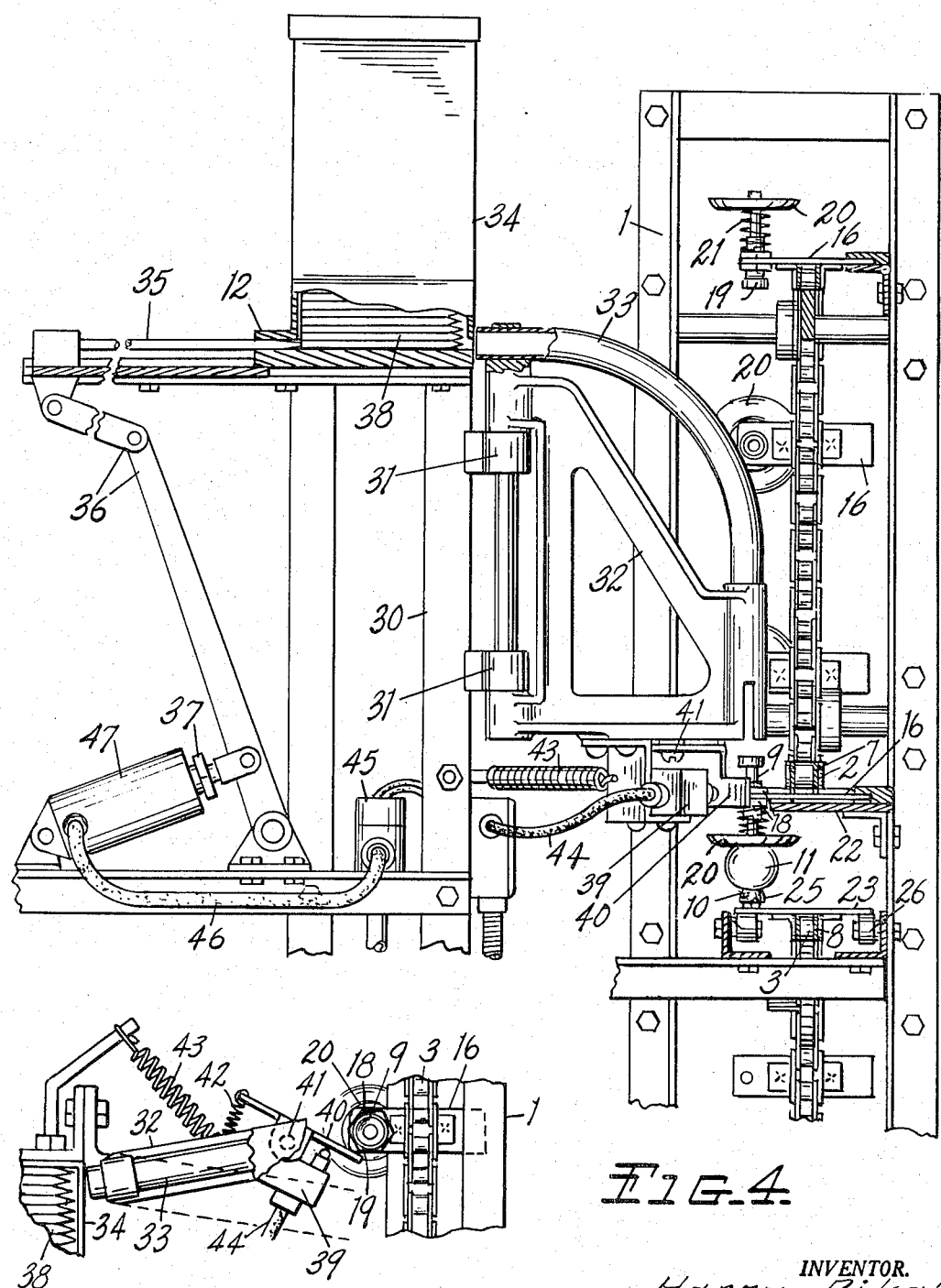

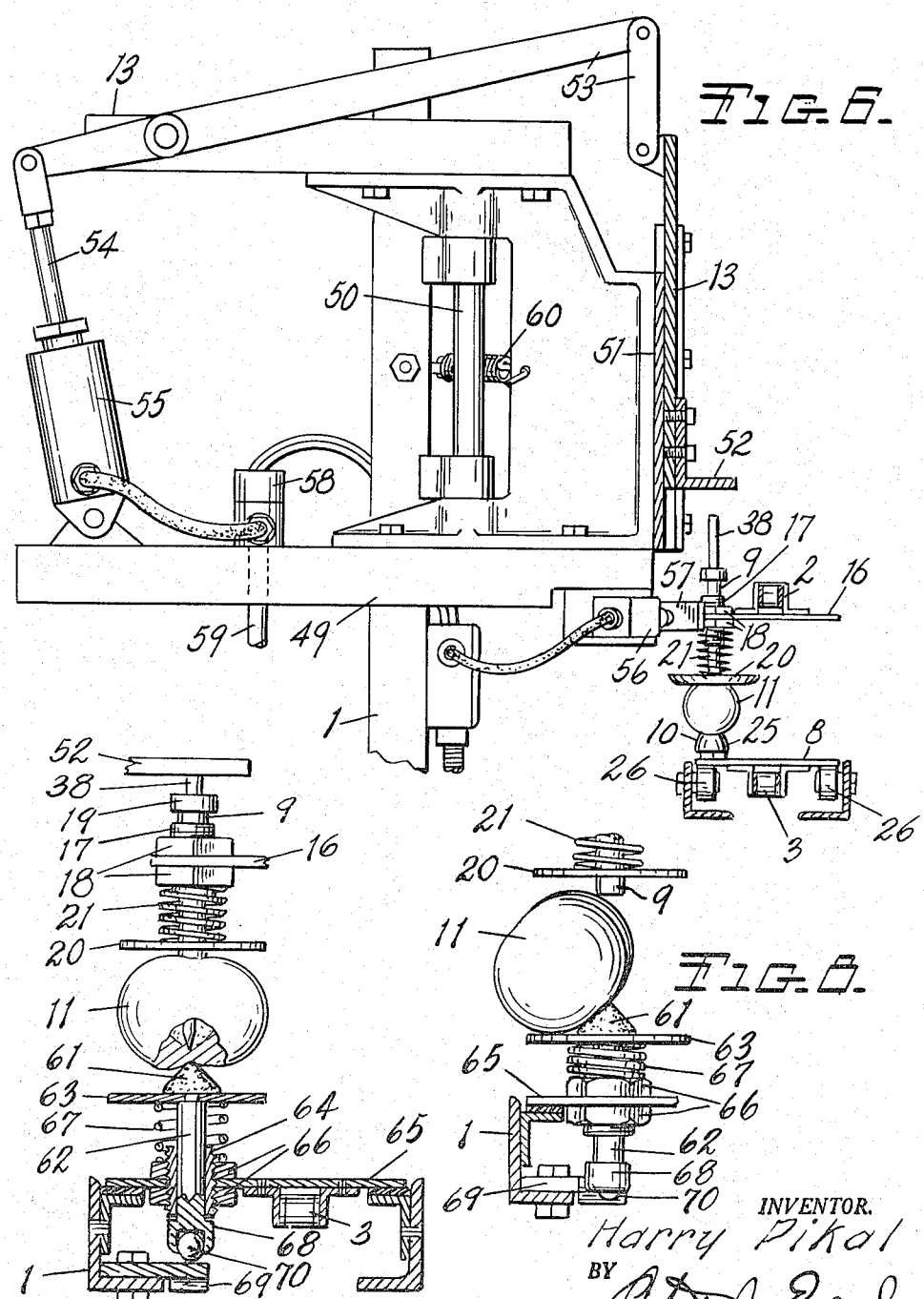

United States Patent Office 2,733,439
Patented Feb. 7, 1956

2,733,439

MACHINE FOR EMBEDDING STICKS IN APPLES

Harry Pikal, Bangor, Mich.

Application December 6, 1954, Serial No. 473,161

20 Claims. (Cl. 1—1)

This invention relates to improvements in a machine for embedding sticks in apples. The principal objects of this invention are:

First, to provide a machine for automatically and accurately embedding a stick in the core of an apple preparatory to coating the apple with a confection.

Second, to provide a machine for accurately aligning the cores of apples and advancing the apples for the reception of sticks.

Third, to provide a machine having apple receiving chucks that are easily loaded in a continuous operation.

Fourth, to provide a machine having a stick feeding mechanism and driving mechanism actuated in timed relation to apple advancing chucks to present and drive a stick in the center of the core of each apple.

Other objects and advantages of the invention will be apparent from a consideration of the following description and claims. The drawings, of which there are four sheets, illustrate a highly practical form of the machine and two forms of chuck mounting therefor.

Fig. 1 is a side elevational view of the machine.

Fig. 2 is a fragmentary transverse cross sectional view taken along the plane of the line 2—2 in Fig. 1 and illustrating the apple and stick holding parts in greater detail.

Fig. 3 is a fragmentary elevational view illustrating one mode of loading apples into the machine.

Fig. 4 is a fragmentary transverse cross sectional view taken along the plane of the line 4—4 in Fig. 1 and illustrating the stick feeding mechanism of the machine.

Fig. 5 is a fragmentary plan view of the mechanism illustrated in Fig. 4 with portions broken away.

Fig. 6 is a fragmentary transverse cross sectional view taken along the plane of the line 6—6 in Fig. 1 and illustrating the stick driving hammer that imbeds the sticks in the apples.

Fig. 7 is a fragmentary cross sectional view similar to Fig. 6 but illustrating a modified form of apple holding chuck.

Fig. 8 is a fragmentary view of the structure shown in Fig. 7 illustrating the mode of loading apples into the modified chuck.

Caramel coated apples as a food product and confection are old and heretofore the sticks that functioned as handles for the sticky confection have been inserted by hand. Hand insertion of the sticks is expensive and slow and considerable skill and strength is required in the operation because to be effective the sticks must be driven axially through the center of the core of the apple. A stick inserted in the meat portion of the apple soon loosens as the bruised meat around the stick decays.

The core of the apple is always straight from the stem end to the blow end of the apple but as is well known the body of the apple is frequently very irregularly shaped and eccentric with respect to the core. It is therefore important that an automoatic machine for inserting sticks in apples be capable of properly aligning the cores of irregularly shaped apples with the mechanism for inserting the sticks. Generally considered the machine includes a suitable supporting frame 1 on which is mounted an upper conveyor 2 and a lower conveyor 3. A motor 4 drives the conveyors at the same speed through chains 5 and 6. The lower reach 7 of the upper conveyor moves in the same direction and in spaced parallel relation to the upper reach 8 of the lower conveyor 3. The upper conveyor 2 carries spaced chucks 9 that are advanced in registry with supports 10 on the lower conveyor. The apples are advanced between supports 10 and chucks 9 as at 11 and pass a stick feeding mechanism 12 and a stick driving mechanism 13. Diverging portions 14 of the conveyors disengage the sticks from the chucks and permit the apples to fall off of the supports onto a discharge conveyor 15 or other receiving platform.

The construction and operation of one form of the apple receiving chucks and supports is more particularly illustrated in Figs. 2 and 3. Plates 16 spaced longitudinally along the upper conveyor 2 have threaded sleeves 17 clamped thereto by nuts 18. The sleeves 17 slidably receive the tubular chucks 9. An enlarged head 19 on the inner ends of the chucks prevents them from falling out of the sleeves while annular plates or collars 20 on the outer ends of the chucks prevent the chucks from falling inwardly through the sleeves. Springs 21 bearing against the collars 20 bias the chucks radially outwardly of the upper conveyor and downwardly toward the supports 10 along the lower reach 7 of the conveyor. The lower reach 7 is supported from the framework 1 by a suitable track or rail 22.

The lower conveyor 3 carries spaced plates 23 on which the supports 10 are mounted. The supports 10 include a mounting bolt 24 and a conical head 25 of deformable material such as rubber. The upper reach 8 of the lower conveyor 3 is supported from the framework by a series of rollers 26 supported by bolts 27. Particularly underneath the stick driving mechanism 13 of the rollers 26 are closely spaced to withstand the driving force applied to the stick.

At the inlet or feeding end of the machine the approaching reaches of the conveyors are desirably enclosed by a shield 28 as a safety measure. A loading opening 29 is provided along both sides of the in-feeding ends of the parallel reaches of the conveyor. As each chuck 9 and support 10 moves along the opening 29 an operator on either side of the machine places an apple 11 between the collar 20 of each chuck and one of the longitudinally extending rollers 120. As is best illustrated in Figs. 2 and 3, the collars 20 desirably have annular depressed rims 121 so that as the apple is pressed between the roller and collar the spring 21 is compressed by camming action of the apple on the upturned outer edge of the collar. The apple is thus easily slid onto the support 25 by a combined tilting and rolling motion on the roller 120. The rollers 120 and the depressed rims 121 are not absolutely necessary to effective functioning of other parts of the machine as is indicated by the conventional illustration of the collars 20 in other Figures of the drawings but their use facilitates rapid loading of the machine.

The stick feeding mechanism 12 is more clearly illustrated in Figs. 4 and 5. The mechanism includes an upright 30 on the frame work having vertically disposed bearing members 31 thereon. The arm 32 is swingably supported on the bearing members and carries a downwardly curved stick delivery tube 33. The lower end of the tube 33 opens over the path of the upper ends of the chucks 9 and the upper inlet end of the tube 33 is positioned generally over the bearings 31 so as to always be in registry with the bottom of a stick hopper 34 supported on the upright 30. A plunger 35 connected by the links 36 to a fluid actuated piston 37 is arranged to drive the bottom stick 38 from the hopper into the delivery tube 33. Mounted on the underside of the arm 32 is a switch 39 having a stop or tappet 40. The tappet 40 is swingable on a pivot pin 41 and biased away from the switch 39 by a spring 42. The outer end of the tappet is disposed in the path of the chunks 9 so that each chuck in turn engages the tappet to first actuate the switch 39 and then swing the arm 32 to hold the discharge end of the tube 33 in registry with the upper end of the chuck. A spring 43 returns the arm after each chuck slides past the tappet 40. The switch 39 is connected through a conductor 44 to a control valve 45. The valve 45 controls the supply of fluid under pressure through a conduit 46 to the cylinder 47 for actuating the piston rod 37. A source of fluid pressure for the cylinder 47 is indicated generally at 48 in Fig. 1.

The mechanism for driving the sticks into the apple is illustrated more clearly in Fig. 6. A frame 49 is swingably supported on the main framework 1 by a vertical pivot 50. The outer end of the frame 49 forms a slideway 51 for the vertically reciprocable hammer 52 that is disposed over the path of the chucks 9 and the sticks 38. The upper end of the hammer 52 is connected by links 53 to a piston rod 54 of a fluid actuated cylinder 55. The cylinder 55 is mounted on the frame 49 to swing therewith and the leverage of the levers 53 is arranged to impart a sharp or rapid downward motion to the hammer 52.

Carried on the underside of the frame 49 is a second control switch 56 having an actuating tappet 57 disposed in the path of the chucks 9. As in the case of the swingable arm of the stick feeding mechanism each chuck in turn engages the tappet 57 to actuating switch 56 and swing the frame 49 in registry with the stick 38. The switch 56 controls a valve 58 for admitting fluid under pressure from the conduit 59 to the cylinder 55. After the cylinder 55 is actuated to drive the stick into the core of the apple and after the chuck 9 moves past the tappet 57 a spring 60 returns the frame 49 and hammer 52 to starting position over the next succeeding chuck.

In the modified form of the apple holding structure shown in Figs. 7 and 8 the upper apple engaging chuck 9 is the same as in the first form of the structure. The spring pressed tubular chuck 9 is urged downwardly against the upper end of the apple by the same spring 21 bearing against the plate or collar 20. The plate 20 may be flat as illustrated or may be dished as illustrated in Figs. 2 and 3. Apple sticks 38 carried by the chuck coact with the hammer 52 as illustrated in Fig. 7 in the regular manner.

The lower support between apples in the modified structure consists of a conical rubber point 61 supported upon a pin 62 with a collar 63 projecting radially beyond the support. The pin 62 is slidably mounted in the threaded sleeve 64 mounted on a plate 65 of the lower conveyor by nuts 66. A spring 67 biases the pin and support upwardly and the spring 67 is stronger than the spring 21 so that the lower spring overcomes the upper spring. An enlarged head 68 on the lower end of the pin limits upward movement of the pin so that the supports 61 and the bottoms of the apples are held at uniform height as they advance along the conveyor. The upper spring pressed chuck accommodates apples of different sizes.

The frame 1 of the machine is provided with a support plate 69 underneath the hammer 52 and the plate 69 engages and supports a ball 70 retained in a recess in the head at the lower end of the pin. The ball rolls along the plate as the chuck is advanced and provides a solid base against which the driving force on the stick is applied.

Along the loading opening 29 of the machine the plate 69 is omitted as shown in Fig. 8 so that the loading operators may press collar 63 and pin 62 downwardly by pressing an apple on the plate. At the same time the recess in the bottom of the apple is easily aligned with the conical support 61 and the apple can be rolled or tilted on the support to align the recess in the top of the apple with the lower end of the chuck 9. The operator then has only to release the downward pressure on the apple and the spring 67 will elevate the apple into engagement with the upper chuck. The mode of loading the chucks shown in Figs. 7 and 8 is considered easier by some persons because it is easier to control and apply pressure against the spring 67 than it is to apply upward pressure against the spring 21.

The machine operates in a highly satisfactory manner with either form of chuck structure and permits a single operator to rapidly advance apples and load them into the machine. The sticks are driven accurately and uniformly into the cores of the apples without special training or fatigue on the part of the operator.

Having thus described the invention what is claimed as new and desired to secure by Letters Patent is:

1. A machine for inserting sticks in apples comprising, a pair of conveyors driven at equal speeds in vertical loops with a reach of each conveyor extending in spaced parallel relation to a reach of the other and running in the same direction, tubular chucks mounted in radially extending relation at spaced points on the upper one of said conveyors and having annular collars spaced between the conveyor and the outer ends of the chucks, springs compressible between said collars and the conveyor and biasing the chucks radially outwardly of the conveyor, supports having deformable conical points mounted on the other lower conveyor in spaced registering relation with the ends of said chucks, a stick feed chute positioned with its discharge end adjacent the path of the inner ends of said chucks and swingably mounted to advance with the chucks, coacting stops on said chucks and chute to advance said chute with each chuck, a spring connected to retract said chute, a stick magazine mounted adjacent the upper inlet end of said chute, a plunger disposed to eject a stick from said magazine into said chute, power means connected to actuate said plunger, a control switch carried by said chute and positioned to be actuated by each chuck, said switch being connected to actuate said power means, a frame swingably supported alongside said one conveyor beyond said chute, a hammer slidable on said frame and swingable therewith over said chucks, a second power means on said frame connected to reciprocate said hammer toward and away from said chucks, a stop on said frame coacting with each chuck to advance said frame with each chuck, a second control switch carried by said frame and positioned to be actuated by each chuck, said second switch being connected to actuate said second power means, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

2. A machine for inserting sticks in apples comprising, a pair of conveyors driven at equal speeds in loops with a reach of each conveyor extending in spaced parallel relation to a reach of the other and running in the same direction, tubular chucks mounted in radially extending relation at spaced points on one of said conveyors and having annular collars spaced between the conveyor and the outer ends of the chucks, springs biasing the chucks radially outwardly of the conveyor, supports having deformable conical points mounted on the other conveyor in spaced registering relation with the ends of said chucks, a stick feed chute positioned with its discharge end adjacent the path of the inner ends of said chucks and swingably mounted to advance with the chucks, coacting stops on said chucks and chute to advance said chute with each chuck, a spring connected to retract said chute, a stick magazine mounted adjacent the inlet end of said chute, a plunger disposed to eject a stick from said magazine into said chute, power means connected to be actuated by each chuck, a switch positioned to be actuated by each chuck, said switch being connected to actuate said power means, a frame swingably supported alongside said one conveyor beyond said chute, a hammer slidable on said frame and swingable therewith over said chucks, a second power means connected to reciprocate said hammer toward and away from said chucks, a stop on said frame coacting with each chuck to advance said frame with each chuck, a second control switch and positioned to be actuated by each chuck, said second switch being connected to actuate said second power means, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

3. A machine for inserting sticks in apples comprising, a pair of conveyors driven at equal speeds with a reach of each conveyor extending in spaced parallel relation to a reach of the other and running in the same direction, tubular chucks mounted in radially extending relation at spaced points on one of said conveyors and having annular collars spaced between the conveyor and the outer ends of the chucks, springs biasing the chucks radially outwardly of the conveyor, supports having deformable points mounted on the other conveyor in spaced registering relation with the ends of said chucks, a frame swingably supported alongside said one conveyor, a hammer slidable on said frame and swingable therewith over said chucks, a power means connected to reciprocate said hammer toward and away from said chucks, a stop on said frame coacting with each chuck to advance said frame with each chuck, a control switch positioned to be actuated by each chuck, said switch being connected to actuate said power means, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

4. A machine for inserting sticks in apples comprising, a pair of conveyors driven at equal speeds with a reach of each conveyor extending in spaced parallel relation to a reach of the other and running in the same direction, chucks slidably mounted in radially extending relation at spaced points on one of said conveyors, springs biasing the chucks radially outwardly of the conveyor, supports having deformable points mounted on the other conveyor in spaced registering relation with the ends of said chucks, a stick feed chute positioned with its discharge end adjacent the path of the inner ends of said chucks, a stick magazine mounted adjacent the inlet end of said chute, a plunger disposed to eject a stick from said magazine into said chute, power means connected to actuate said plunger, a control switch positioned to be actuated by each chuck, said switch being connected to actuate said power means, a frame supported alongside said one conveyor beyond said chute, a hammer slidable on said frame over said chucks, a second power means connected to reciprocate said hammer toward and away from said chucks, a second control switch positioned to be actuated by each chuck, said second switch being connected to actuate said second power means, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

5. A machine for inserting sticks in apples comprising, a pair of conveyors driven at equal speeds with a reach of each conveyor extending in spaced parallel relation to a reach of the other and running in the same direction, chucks mounted in radially extending relation at spaced points on one of said conveyors, supports having deformable points mounted on the other conveyor in spaced registering relation with the ends of said chucks, a stick feed chute positioned with its discharge end adjacent the path of the inner ends of said chucks, a stick magazine mounted adjacent the inlet end of said chute, a plunger disposed to eject a stick from said magazine into said chute, power means connected to actuate said plunger, a control switch positioned to be actuated by each chuck, said switch being connected to actuate said power means, a frame supported alongside said one conveyor beyond said chute, a hammer slidable on said frame over said chucks, a second power means connected to reciprocate said hammer toward and away from said chucks, a second control switch positioned to be actuated by each chuck, said second switch being connected to actuate said second power means, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

6. A machine for inserting sticks in apples comprising, a pair of conveyors driven at equal speeds in vertical loops with a reach of each conveyor extending in spaced parallel relation to a reach of the other and running in the same direction, chucks having stick receiving passages therein slidably mounted in radially extending relation at spaced points on one of said conveyors, springs biasing the chucks radially outwardly of the conveyor, supports having outwardly facing points mounted on the other conveyor in spaced registering relation with the ends of said chucks, a stick feed chute positioned with its discharge end adjacent the path of the inner ends of said chucks and swingably mounted to advance with the chucks, coacting stops on said chucks and chute to advance said chute with each chuck, a spring connected to retract said chute, a stick magazine mounted adjacent the upper inlet end of said chute, a plunger disposed to eject a stick from said magazine into said chute, power means connected to actuate said plunger, a control switch carried by said chute and positioned to be actuated by each chuck, said switch being connected to actuate said power means, a frame swingably supported alongside said one conveyor beyond said chute, a hammer slidable on said frame and swingable therewith over said chucks, a second power means on said frame connected to reciprocate said hammer toward and away from said chucks, a stop on said frame coacting with each chuck to advance said frame with each chuck, a second control switch carried by said frame and positioned to be actuated by each chuck, said second switch being connected to actuate said second power means, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

7. A machine for inserting sticks in apples comprising, a pair of conveyors driven at equal speeds in vertical loops with a reach of each conveyor extending in spaced parallel relation to a reach of the other and running in the same direction, chucks having stick receiving passages therein slidably mounted in radially extending relation at spaced points on one of said conveyors, springs biasing the chucks radially outwardly of the conveyor, supports having outwardly facing points slidably mounted on the other conveyor in spaced registering relation with the ends of said chucks, other springs biasing said supports toward said chucks, said other springs being stronger than said first springs, a frame swingably supported alongside said one conveyor, a hammer slidable on said frame and swingable therewith over said chucks, power means on said frame connected to reciprocate said hammer toward and away from said chucks, a stop on said frame coacting with each chuck to advance said frame, a switch positioned to be actuated by each chuck while it is engaged with said stop, said switch being connected to actuate said power means, a rail extending along said other conveyor under said hammer and supporting the inner ends of said supports, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

8. A machine for inserting sticks in apples comprising, a pair of conveyors driven at equal speeds with a reach of each conveyor extending in spaced parallel relation to a reach of the other and running in the same direction, chucks having stick receiving recesses formed therein mounted in radially extending relation at spaced points on one of said conveyors, supports having points mounted on the other conveyor in spaced registering relation with the ends of said chucks, means permitting yieldable movement of said chucks and supports relative to each other, a frame swingably supported alongside said one conveyor, a hammer slidable on said frame and swingable therewith over said chucks, power means on said frame connected to reciprocate said hammer toward and away from said chucks, a stop on said frame coacting with each chuck to advance said frame with each chuck, a control switch carried by said frame and positioned to be actuated by each chuck, said switch being connected to actuate said power means, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

9. A machine for inserting sticks in apples comprising, a pair of conveyors driven at equal speeds with a reach of each conveyor extending in spaced parallel relation to a reach of the other and running in the same direction, chucks having stick receiving recesses formed therein mounted in radially extending relation at spaced points on one of said conveyors, supports having points mounted on the other conveyor in spaced registering relation with the ends of said chucks, means permitting yieldable movement of said chucks and supports relative to each other, a frame supported alongside said one conveyor, a hammer slidable on said frame over said chucks, power means connected to reciprocate said hammer toward and away from said chucks, a control switch positioned to be actuated by each chuck, said switch being connected to actuate said power means, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

10. A machine for inserting sticks in apples comprising, a pair of conveyors driven at equal speeds with a reach of each conveyor extending in spaced parallel relation to a reach of the other and running in the same direction, chucks having stick receiving passages therein mounted in radially extending relation at spaced points on one of said conveyors, supports having outwardly facing points slidably mounted on the other conveyor in spaced registering relation with the ends of said chucks, a frame swingably supported alongside said one conveyor, a hammer slidable on said frame and swingable therewith over said chucks, power means on said frame connected to reciprocate said hammer toward and away from said chucks, a stop on said frame coacting with each chuck to advance said frame with each chuck, a control switch carried by said frame and positioned to be actuated by each chuck, said switch being connected to actuate said power means, a fixed abutment positioned under said hammer to support the inner end of said supports, and a downwardly facing reach in the conveyor carrying the supports unopposed by said chucks beyond the hammer whereby the apples with the sticks therein may be discharged by gravity from the supports and from said chucks, the stroke of said hammer being of such a length as to drive a stick into the core of an apple engaged with each chuck.

11. In a machine for placing sticks in apples, a pair of conveyors having spaced parallel reaches advanced at equal speed, sleeves carried by one conveyor at spaced intervals and projecting toward the other conveyor at said reaches and opening through said one conveyor, a chuck slidable in each sleeve and opening through said one conveyor, collars adjacent the ends of the sleeves opposed to the other conveyor, springs urging said chucks toward the other conveyor, and supports mounted on the other conveyor in spaced relation to said chucks, said supports having pointed ends.

12. A machine for placing sticks in the cores of apples comprising, a pair of conveyors having spaced reaches advanced at equal speeds, tubular chucks yieldably supported on one conveyor in opposed registry with deformable supports on the other of the conveyors, means for feeding sticks into the chucks along said reaches, a hammer reciprocable toward and away from the ends of said chucks to drive sticks therein into apples engaged with the chucks, means connected to actuate said hammer in timed relation to movement of said chucks, and diverging portions at the ends of said reaches moving said chucks away from said supports and permitting disengagement of apples and sticks from said chucks.

13. A machine for placing sticks in the cores of apples comprising, a pair of conveyors having spaced reaches advanced at equal speeds, stick receiving chucks supported on one conveyor in opposed registry with deformable supports on the other of the conveyors, a hammer reciprocable toward and away from the ends of said chucks to drive sticks therein into apples engaged with the chucks, means connected to actuate said hammer in timed relation to movement of said chucks, and diverging portions at the ends of said reaches moving said chucks away from said supports and permitting disengagement of apples and sticks from said chucks.

14. A machine for placing sticks in the cores of apples comprising, a pair of conveyors having spaced reaches advanced at equal speeds, chucks having stick receiving recesses formed therethrough supported on one conveyor in opposed registry with supports on the other of the conveyors, a hammer reciprocable toward and away from the ends of said chucks to drive sticks therein into apples engaged with the chucks, and means connected to actuate said hammer in timed relation to movement of said chucks, said chucks and supports being mounted on said conveyors for yieldable movement relative to each other.

15. A machine for placing sticks in the cores of apples comprising, a pair of conveyors having spaced reaches advanced at equal speeds, chucks having stick receiving recesses formed therethrough supported on one conveyor in opposed registry with supports on the other of the conveyors, a hammer reciprocable toward and away from the ends of said chucks to drive sticks therein into apples engaged with the chucks, and means connected to actuate said hammer in timed relation to movement of said chucks, said supports and chucks having opposed relatively yieldable work surface adapted to engage apples therebetween.

16. In a machine for placing sticks in apples, a pair of conveyors having spaced parallel reaches advanced at equal speed, chucks carried by one conveyor at spaced intervals and disposed perpendicular to the other conveyor at said reaches, said chucks having stick receiving recesses formed therethrough, supports slidably mounted on the other conveyor in spaced relation to said chucks, and springs urging said supports toward said chucks, said supports and chucks having opposed ends formed to engage the ends of an apple therebetween.

17. A machine for embedding sticks in apples comprising, a pair of conveyors having spaced reaches advanced at equal speeds in parallel relation, a plurality of deformable conical supports carried by one conveyor and directed toward the other conveyor along said reaches, chucks carried by the other conveyor in registry with said supports and projecting toward said supports along said reaches, said chucks having work engaging ends adapted to engage the end of an apple at the end of the core of the apple and having stick receiving recesses formed therethrough, radially extending collars on said chucks and spaced from their work engaging ends, said collars having annular rims with downwardly and then upwardly cammed undersurfaces extending radially inwardly toward said chucks, elongated rollers disposed longitudinally along the sides of said reaches in laterally spaced relation to said supports and in spaced relation to said collars whereby movement of an apple between the roller and a collar on one side of said reaches moves the chuck away from its associated support, said supports being movable normally with respect to said reaches and being biased toward said supports, and means positioned over said reaches to drive a stick supported in a chuck into an apple and toward the support engaging the apple.

18. A machine for embedding sticks in apples comprising, a pair of conveyors having spaced reaches advanced at equal speeds in parallel relation, a plurality of supports carried by one conveyor adapted to engage the recessed center of an apple and directed toward the other conveyor along said reaches, chucks carried by the other conveyor in registry with said supports and projecting toward said supports along said reaches, said chucks having work engaging ends adapted to engage the other end of an apple and having stick receiving recesses formed therethrough, plates extending radially from the sides of said chucks and spaced from their work engaging ends, said plates having convexly cammed surfaces extending toward said chucks, elongated rollers disposed longitudinally along the sides of said reaches in laterally spaced relation to said supports and in spaced relation to said plates whereby movement of an apple between the roller and a plate on one side of said reaches moves the chuck and its associated support apart, said supports and chucks being movable with respect to each other normally of said reaches and being biased toward each other, and means positioned adjacent said reaches to drive a stick supported in a chuck into an apple and toward the support engaging the apple.

19. In a machine for advancing apples and having conveyors with spaced parallel reaches for advancing the apples, a plurality of spaced supports on one conveyor adapted to engage one recessed end of said apples, a tubular chuck element carried by the other conveyor in registry with each of said supports and having a stick receiving recess formed through the center of the chuck, said chucks being yieldably biased toward said supports, and collars on said chucks spaced from the ends of the chuck, said collars having annular offset grooves formed around their periphery with downwardly and then upwardly cammed undersurfaces extending radially inwardly to said chucks.

20. In a machine for advancing apples and having conveyors with spaced parallel reaches for advancing the apples, a plurality of spaced supports on one conveyor adapted to engage one recessed end of said apples, a chuck element carried by the other conveyor in registry with each of said supports and having a stick receiving recess formed through the center of the chuck, said chucks and supports being movable with respect to each other and being yieldably biased toward each other, and plates on said chucks spaced from the ends of the chuck, said plates having convexly cammed undersurfaces extending radially inwardly to said chuck and facing said supports.

References Cited in the file of this patent
UNITED STATES PATENTS

| 1,292,261 | Clifford | Jan. 21, 1919 |
| 1,407,524 | Fourchy | Feb. 21, 1922 |
| 2,569,355 | Tubbs | Sept. 25, 1951 |